United States Patent
Takagi et al.

(10) Patent No.: US 11,724,249 B2
(45) Date of Patent: Aug. 15, 2023

(54) CU—P CO-SUPPORTED ZEOLITE, AND SELECTIVE CATALYTIC REDUCTION CATALYST AND CATALYST FOR EXHAUST GAS USING SAME

(71) Applicant: N.E. CHEMCAT CORPORATION, Minato-ku (JP)

(72) Inventors: Yukio Takagi, Minato-ku (JP); Kiyohiko Saito, Minato-ku (JP); Yasuyuki Banno, Minato-ku (JP); Makoto Nagata, Minato-ku (JP)

(73) Assignee: N.E. CHEMCAT CORPORATION, Minato-ku (JP)

( * ) Notice: Subject to any disclaimer, the term of this patent is extended or adjusted under 35 U.S.C. 154(b) by 66 days.

(21) Appl. No.: 17/283,401

(22) PCT Filed: Oct. 16, 2019

(86) PCT No.: PCT/JP2019/040735
§ 371 (c)(1),
(2) Date: Apr. 7, 2021

(87) PCT Pub. No.: WO2020/085169
PCT Pub. Date: Apr. 30, 2020

(65) Prior Publication Data
US 2021/0379573 A1 Dec. 9, 2021

(30) Foreign Application Priority Data

Oct. 23, 2018 (JP) ................................. 2018-199527
Nov. 26, 2018 (JP) ................................. 2018-220354

(51) Int. Cl.
| | |
|---|---|
| *B01J 29/76* | (2006.01) |
| *B01D 53/94* | (2006.01) |
| *B01J 35/02* | (2006.01) |
| *B01J 35/04* | (2006.01) |
| *B01J 35/10* | (2006.01) |
| *C01B 39/48* | (2006.01) |

(52) U.S. Cl.
CPC ........ *B01J 29/763* (2013.01); *B01D 53/9418* (2013.01); *B01J 35/023* (2013.01); *B01J 35/04* (2013.01); *B01J 35/1061* (2013.01); *B01J 35/1066* (2013.01); *C01B 39/48* (2013.01); *B01D 2255/20761* (2013.01); *B01D 2255/50* (2013.01); *C01P 2002/72* (2013.01)

(58) Field of Classification Search
None
See application file for complete search history.

(56) References Cited

U.S. PATENT DOCUMENTS

| | | | | |
|---|---|---|---|---|
| 9,764,313 | B2 * | 9/2017 | Trukhan | B01D 53/9477 |
| 2013/0084222 | A1 * | 4/2013 | Grubert | B01J 29/04 |
| | | | | 502/73 |
| 2013/0142727 | A1 * | 6/2013 | Li | B01J 29/88 |
| | | | | 423/709 |
| 2016/0144347 | A1 | 5/2016 | Sano et al. | |
| 2017/0341022 | A1 * | 11/2017 | Andersen | F01N 3/085 |

FOREIGN PATENT DOCUMENTS

| | | | |
|---|---|---|---|
| CN | 104607239 | * | 5/2015 |
| CN | 107949436 | * | 4/2018 |
| JP | H06134314 | * | 5/1994 |
| JP | 2010-519038 A | | 6/2010 |
| JP | 2015-134698 A | | 7/2015 |
| JP | 2017-48106 A | | 3/2017 |
| JP | 6320918 B2 | | 5/2018 |
| WO | WO 2008/106519 A1 | | 9/2008 |
| WO | WO 2013/016522 A2 | | 1/2013 |

OTHER PUBLICATIONS

Kakiuchi, Yutaro et al. "One-pot Synthesis of Phosphorus-modified AEI Zeolites Derived by the Dual-Template Method . . . ". Chem. Lett., 45, 122-124 (2016) (Year: 2016).*
Kunpeng Xie, et al. "Insights into hydrothermal aging of phosphorus-poisoned Cu—SSZ-13 for $NH_3$-SCR", Applied Catalysis B. Environmental, Elsevier, Amsterdam, 2019, vol. 241, pp. 205-216.
International Search Report dated Dec. 24, 2019 in PCT/JP2019/040735 filed Oct. 16, 2019, citing documents AA and AS-AT therein, 2 pages.
Blasco, T., et al., "Hydrothermal stabilization of ZSM-5 catalytic-cracking additives by phosphorus addition", Journal of Catalysis, vol. 237, 2006, pp. 267-277.
Sano, T., "Synthesis of Zeolite with High Durability and its Application to SCR Catalyst", Symposium of Society of Automotive Engineers of Japan, 2018, pp. 43-47.
Sano, T., et al., "Catalysts" vol. 60, No. 5, 2018, pp. 240-246.

* cited by examiner

*Primary Examiner* — Sheng H Davis
(74) *Attorney, Agent, or Firm* — Oblon, McClelland, Maier & Neustadt, L.L.P.

(57) ABSTRACT

Provided are a high-performance Cu—P co-supported zeolite and the like having excellent thermal endurance and catalyst performance. A Cu—P co-supported zeolite comprising at least a small pore size zeolite, and an extra-backbone copper atom and an extra-backbone phosphorus atom supported on the small pore size zeolite, wherein a silica-alumina ratio ($SiO_2/Al_2O_3$) is 7 or more and 20 or less, a ratio of the copper atom to a T atom (Cu/T) is 0.005 or more and 0.060 or less, a ratio of the phosphorus atom to the T atom (P/T) is 0.005 or more and 0.060 or less, and a ratio of the phosphorus atom to the copper atom (P/Cu) is 0.1 or more and 3 or less.

8 Claims, No Drawings

CU—P CO-SUPPORTED ZEOLITE, AND SELECTIVE CATALYTIC REDUCTION CATALYST AND CATALYST FOR EXHAUST GAS USING SAME

TECHNICAL FIELD

The present invention relates to a novel Cu—P co-supported zeolite, and a selective catalytic reduction catalyst, a catalyst for exhaust gas and the like using the same.

BACKGROUND ART

Zeolites have a backbone structure having regular pores having a constant size and are widely used for various industrial purposes such as desiccants, dehydrating agents, adsorbents or separating agents for various inorganic or organic molecules through the use of difference in polarity or molecular size, ion exchangers, petroleum refinery catalysts, petrochemical catalysts, and solid acid catalysts. A database of the backbone structures of various zeolites is compiled by International Zeolite Association (hereinafter, also abbreviated to "IZA") and includes more than 200 types of backbone structures of zeolites at present. However, only about 10 types of zeolites are industrially used.

Zeolite, is an aluminosilicate crystalline material having a relatively uniform pore size that is, though depending on the type of zeolite and the amount of cation contained in the zeolite lattice, typically about 3 to 10 angstroms in diameter. Both synthetic and natural zeolites, and their use to promote specified reactions, including a selective reaction of nitrogen oxide and ammonia in the presence of oxygen, are known in the art.

Metal-promoted zeolite catalysts for selective catalytic reduction of nitrogen oxide with ammonia, especially iron-promoted zeolite catalysts and copper-promoted zeolite catalysts are also known. Copper-promoted zeolite beta is one of the effective catalysts for selective reduction of nitrogen oxide with ammonia. For example, Patent Literature 1 discloses a method for reducing a nitrogen oxide (hereinafter, also referred to as "NOx") contained in gas stream with a Cu supported zeolite that exhibits good hydrothermal stability.

Non Patent Literature 1 also describes a method for post-treatment of zeolite with a phosphate compound in order to increase endurance as a catalyst and catalytic activity. In this Non Patent Literature 1, it has been found that allowing an MFI-type zeolite (maximum pore: oxygen 10-membered ring middle pore zeolite) to support phosphoric acid or diammonium monohydrogen phosphate, and calcinating after protecting Al sites that have relatively low heat resistance improve heat resistance and enhance catalytic activity in the cracking reaction of n-butane after hydrothermal endurance treatment over untreated products.

Non Patent Literature 2, however, reports that post-treatment with a phosphate compound such as in Non Patent Literature 1 described above is ineffective in zeolites having an oxygen 8-membered ring in maximum pore (small pore zeolites), such as CHA-type zeolites. This is considered probably because the molecular size of phosphoric acid (about 4 Å) is larger than the pores of the small pore zeolite (CHA-type: about 3.8 Å) which makes it difficult for phosphoric acid to penetrate into the pores of the zeolite. Non Patent Literature 3 also describes that modification of phosphoric acid unmodified zeolite by impregnation with diammonium hydrogen phosphate did not result in improved heat resistance, and describes that post-treatment of zeolite with a phosphate compound is ineffective in small pore zeolites.

Thus, as shown in Patent Literature 2, it has been studied in small pore zeolite such as CHA-type zeolite to increase hydrothermal stability by blending a phosphorus compound upon synthesis of a CHA-type zeolite, introducing a small amount of phosphorus atoms into the CHA backbone (framework), and synthesizing a phosphorus T-atom-containing low-phosphorus molecular sieve by exchanging a portion of the backbone T atom or the like with a phosphorus atom.

Furthermore, as shown in Patent Literature 3, a method has been studied in which phosphorus is contained in out-of-the backbone of the CHA-type zeolite, i.e., as an atom other than a T atom, by allowing a phosphonium cation to coexist with an ammonium cation of OSDA at the time of synthesis, without introducing a phosphorus atom into the Si and Al-containing CHA backbone (framework) of the CHA-type zeolite.

CITATION LIST

Patent Literature

Patent Literature 1: National Publication of International Patent Application No. 2010-519038
Patent Literature 2: Japanese Patent No. 6320918
Patent Literature 3: Japanese Patent Laid-Open No. 2017-048106

Non Patent Literature

Non Patent Literature 1: T. Blasco et al., J. Catal., 237 (2006) 267-277
Non Patent Literature 2: Feb. 28, 2018, "Synthesis of Durable Zeolite and Application for SCR Catalyst", Sano Tsuneji, preliminary report for Symposium of Society of Automotive Engineers of Japan, p. 43-47
Non Patent Literature 3: Sano Tsuneji, Tsunoji Nao, Catalysts, 60 (2018) 240-246

SUMMARY OF INVENTION

Technical Problem

However, although the method described in Patent Literature 2 is directed to achieve a phosphorus T-atom-containing low-phosphorus molecular sieve having a silica-alumina ratio of about 12 to 32 as shown in Table 1, in practice, as shown in Tables 2 and 3, only a CHA-type zeolite having a high silica-alumina ratio with a silica-alumina ratio of about 40 has been achieved, it is thus believed that it is difficult by this method to synthesize a zeolite having a low silica-alumina ratio, which can contain more catalytic metals. It is also believed that even if such a zeolite having a low silica-alumina ratio could be synthesized, it is difficult to make it have high thermal endurance.

Also, the method described in Patent Literature 3 is directed to achieve a CHA-type zeolite having a silica-alumina ratio of about 16 to 100, but in practice, as shown in Tables 1 and 2, only a CHA-type zeolite having a high silica-alumina ratio with a silica-alumina ratio of about 22 to 24 has been achieved. Thus, it is also difficult by this method to synthesize a zeolite having a low silica-alumina ratio, which can contain more catalytic metals. Furthermore, it is unclear whether such a low silica-alumina-ratio zeolite can have high thermal endurance. Moreover, the method described in Patent Literature 3 requires to use relatively expensive phosphonium compounds as starting materials. Thus, it has much room for improvement in terms of production costs and production processes.

Moreover, in the methods of Patent Literatures 2 and 3, phosphorus is blended before supporting catalytic metal such as copper onto a surface of zeolite. Thus, this pre-blended phosphorus protects a portion of the ion exchange point based on zeolite intra-backbone Al. The sites thus protected are unable to act as the ion exchange point for copper, and as a result, the zeolite cannot express sufficient ion exchange capacity when supporting a catalytic metal such as copper onto a surface of zeolite, and consequently is unable to have a large supported amount of catalytic metal. Thus, in the methods of Patent Literatures 2 and 3, the expected effect of improving NOx purification performance after hydrothermal endurance treatment is insufficient.

The present invention has been made in light of the problems described above. An object of the present invention is to provide a high-performance Cu—P co-supported zeolite in which an extra-backbone copper atom and an extra-backbone phosphorus atom are supported on a small pore size zeolite, where the zeolite has excellent thermal endurance and catalyst performance and the like. Another object of the present invention is to provide a selective catalytic reduction catalyst formed article, a catalyst for exhaust gas and the like using the high-performance Cu—P co-supported zeolite, where those are excellent in catalyst performance.

Not only the objects described herein but the exertion of working effects that are derived from each configuration given in "Description of Embodiments" mentioned later and cannot be obtained by conventional techniques can also be interpreted as an alternative object of the present invention.

Solution to Problem

The present inventors have conducted diligent studies to attain the objects, and consequently completed the present invention by finding that a specific Cu—P co-supported zeolite in which an extra-backbone copper atom and an extra-backbone phosphorus atom are supported on a small pore size zeolite has excellent thermal endurance and catalyst performance. Specifically, the present invention provides various specific aspects given below.

<1>

A Cu—P co-supported zeolite comprising at least a small pore size zeolite, and an extra-backbone copper atom and an extra-backbone phosphorus atom supported on the small pore size zeolite, wherein
a silica-alumina ratio ($SiO_2/Al_2O_3$) is 7 or more and 20 or less,
a ratio of the copper atom to a T atom (Cu/T) is 0.005 or more and 0.060 or less,
a ratio of the phosphorus atom to the T atom (P/T) is 0.005 or more and 0.060 or less, and
a ratio of the phosphorus atom to the copper atom (P/Cu) is 0.1 or more and 3 or less.

<2>

The Cu—P co-supported zeolite according to <1>, wherein the small pore size zeolite has an oxygen 8-membered ring structure.

<3>

The Cu—P co-supported zeolite according to <1> or <2>, wherein the small pore size zeolite has at least one backbone structure selected from the group consisting of CHA, AEI, and ERI in measurement by powder X-ray diffractometry.

<4>

The Cu—P co-supported zeolite according to any one of <1> to <3>, wherein the small pore size zeolite has a crystallite size of 10 nm or more and 50 nm or less in measurement by powder X-ray diffractometry.

<5>

The Cu—P co-supported zeolite according to any one of <1> to <3>, wherein the small pore size zeolite has a crystallite size of 15 nm or more and 100 nm or less in measurement by powder X-ray diffractometry.

<6>

The Cu—P co-supported zeolite according to any one of <1> to <5>, wherein the Cu—P co-supported zeolite has an average particle size $D_{50}$ of 0.01 μm or more and 20 μm or less.

<7>

A selective catalytic reduction catalyst comprising at least the Cu—P co-supported zeolite according to any one of <1> to <6>.

<8>

A selective catalytic reduction catalyst formed article obtained by forming a composition comprising the Cu—P co-supported zeolite according to any one of <1> to <6> into a predetermined shape.

<9>

A catalyst for exhaust gas, comprising at least a substrate and a catalyst layer provided on at least one side of the substrate, wherein the catalyst layer contains at least the Cu—P co-supported zeolite according to any one of <1> to <6>.

Advantageous Effects of Invention

The present invention can achieve a high-performance Cu—P co-supported zeolite in which an extra-backbone copper atom and an extra-backbone phosphorus atom are supported on a small pore size zeolite, where the zeolite has excellent thermal endurance and catalyst performance. Furthermore, this Cu—P co-supported zeolite can be used to achieve a selective catalytic reduction catalyst, a catalyst for exhaust gas and the like which are excellent in purification performance.

DESCRIPTION OF EMBODIMENTS

Hereinafter, embodiments of the present invention will be described in detail. The embodiments below are given merely for illustrating exemplary (typical) embodiments of the present invention. The present invention is not intended to be limited by them. The present invention can be carried out by arbitrarily making changes or modifications without departing from the spirit of the present invention. In the present specification, numerical values or physical property values expressed to sandwich the term "to" are used to include the values. For example, the numerical range of "1 to 100" encompasses both the upper limit value "100" and the lower limit value "1". The same holds true for the expression of other numerical ranges.

The Cu—P co-supported zeolite of the present embodiment contains at least a small pore size zeolite, and an extra-backbone copper atom and an extra-backbone phosphorus atom supported on the small pore size zeolite, where a silica-alumina ratio ($SiO_2/Al_2O_3$) is 7 or more and 20 or less, a ratio of the copper atom to a T atom (Cu/T) is 0.005 or more and 0.060 or less, a ratio of the phosphorus atom to the T atom (P/T) is 0.005 or more and 0.060 or less, and a ratio of the phosphorus atom to the copper atom (P/Cu) is 0.1 or more and 3 or less.

As described above, Cu—P co-supported zeolites of such composition has been thought not to be obtainable by post-treatment of zeolite with phosphate compounds, and, even if realized, excellent thermal endurance and catalyst performance would not be obtained. This is because it has been thought that it is difficult to allow a small pore size zeolite to cosupport an extra-backbone copper atom and an extra-backbone phosphorus atom. The reasons for this are shown below.

Conventionally, it has been believed in the art that, since phosphoric acid (about 4 Å) is larger than the pores of the small pore zeolite (e.g., CHA: about 3.8 Å), it is difficult to cause phosphoric acid to penetrate into the pores of the small pore zeolite to allow phosphorus to be supported on the pore surface. However, the present inventors have thought that phosphoric acid can be penetrated into the pores of the small pore zeolite and be supported on the pore surface, because the pores of the small pore zeolite become larger or smaller due to atomic molecular vibration under the environment of above room temperature (25° C.). Especially because the Al—O bond is an ionic bond, it has more flexibility in the bond length and bond angle compared to the Si—O covalent bond. Additionally, increasing the processing temperature during the processing, thereby promoting atomic molecular vibration, promotes penetration of phosphoric acid into the pores of the small pore zeolite. That is, phosphorus can be permeated into the zeolite by setting the temperature when subjecting a catalyst, to which the Cu—P co-supported zeolite is applied, to calcination or hydrothermal endurance treatment to, for example, preferably 350° C. or higher, more preferably 400° C. or higher, and even more preferably 450° C. or higher. In addition, when a silica-alumina ratio ($SiO_2$/$Al_2O_3$, molar ratio, hereinafter, sometimes referred to as "SAR") of the small pore zeolite is low (Al is high), Al is prone to detach from the backbone by de-Al, thus the pore size of the pores expands, making it easier for phosphoric acid to penetrate into the pores of the small pore zeolite.

Meanwhile, when a P supporting treatment is performed by impregnating a Cu supported small pore zeolite with phosphoric acid as a strong aqueous acid solution, Cu adsorbed to the acid point of the zeolite will be dissolved by phosphoric acid, and flowed. As another way, reducing the acidity of phosphoric acid by using diammonium hydrogen phosphate instead of phosphoric acid may be considered. However, free ammonia molecules generated from diammonium hydrogen phosphate coordinate with copper and produce soluble copper ammine complexes, which still causes flow by copper dissolution. It is believed that such flow of Cu during P supporting treatment is one of the factors that consequently degrades the catalyst performance. Here, "flow of Cu" refers to the solubilization and migration of Cu in zeolite and/or the elution of Cu into the aqueous phase of the slurry upon honeycomb application.

In contrast, the present inventors have found that a use of a treatment solution containing at least phosphoric acid and an organic base, i.e., an aqueous phosphoric acid solution neutralized with an organic amine that is difficult to produce a complex with copper in advance in a P supporting step or the like suppresses the flow of Cu during the P supporting treatment described above, so that Cu supported on the surface of zeolite can be maintained with high efficiency while allowing P to be co-supported with high efficiency. The present inventors have further found that, since P is supported after Cu is supported, protection by phosphorus at the ion exchange point, which occurs in the conventional art, is difficult to occur, and thus sufficient cosupport of Cu and P can be performed. As further detailed explanation, it is known that the form of copper supported at the ion exchange point in the zeolite includes a form in which $Cu^{2+}$ is attached to two ion exchange points and a form in which $Cu(OH)^+$ is attached to one ion exchange point (Non Patent Literature, J. Song et al., ACS Catal. 7 (2017) 8214-8227). Of these, the former has excellent hydrothermal endurance, but the latter is inferior, thus the latter is inappropriate as an active point structure for automotive catalyst materials with harsh usage conditions, and the catalyst materials require to have many of the former. Meanwhile, in order to create the structure of the former, a structure called Paired Al is needed. This structure refers to a structure that has two ion exchange points based on intra-backbone Al in the range where a copper atom reaches. Specifically, it refers to a structure in which there are one or two Si atoms between two intra-backbone Al atoms. In this Paired Al structure, it is known that, as the ratio of (Paired Al)/(intra-backbone Al) is larger, there is more intra-backbone Al, i.e., the SAR is smaller (Non Patent Literature C. Paolucci et al., J. Am. Chem. Soc. 138 (2016) 6028-6048). From these viewpoints, in order to obtain materials with more structures of the former, it is desired that copper is applied in advance to a zeolite with a relatively high intra-backbone Al content (low SAR) to allow the zeolite to have many structures of the former, then excess intra-backbone Al is protected with phosphorus to improve hydrothermal endurance.

As described above, the present inventors have found for the first time that an extra-backbone copper atom and an extra-backbone phosphorus atom can be co-supported to a small pore size zeolite by post-treatment of a zeolite with a phosphate compound. Furthermore, the present inventors have further found for the first time that the obtained Cu—P co-supported zeolite has a novel blended composition and also exhibits excellent thermal endurance and catalyst performance. Further details are given below, with showing an example of a method for producing a suitable Cu—P co-supported zeolite.

[Production of Cu—P Co-Supported Zeolite]

An example of a method for producing the Cu—P co-supported zeolite of the present embodiment, i.e., a Cu—P co-supported zeolite containing at least a small pore size zeolite, and an extra-backbone copper atom and an extra-backbone phosphorus atom supported on the small pore size zeolite, includes at least a preparing step (S11) of a Cu supported zeolite, and a P supporting step (S21) of adding a treatment solution containing at least phosphoric acid and an organic base to the Cu supported zeolite.

According to this method for producing a Cu—P co-supported zeolite, copper and phosphorus can be co-supported at a desired supported amount, where the method is a post-supported method with a phosphate compound which has been believed as ineffective in small pore zeolites in the conventional art. According to the method for producing a Cu—P co-supported zeolite, a high-performance Cu—P co-supported zeolite having excellent thermal endurance and suppressed degradation of catalyst performance can thus be obtained at a relatively low cost in a simpler process with a small environmental load.

The reason why such advantages are exhibited is not cleared, but the present inventors presume as follows, but the effects are not limited by these. Conventionally, it has been believed in the art that, since phosphoric acid (about 4 Å) is larger than the pores of the small pore zeolite (e.g., CHA: about 3.8 Å), it is difficult to cause phosphoric acid to penetrate into the pores of the small pore zeolite to allow phosphorus to be supported on the pore surface. However, the present inventors have thought that phosphoric acid can be penetrated into the pores of the small pore zeolite and be supported on the pore surface, because the pores of the small pore zeolite become larger or smaller due to atomic molecular vibration under the environment of above room temperature (25° C.). Especially because the Al—O bond is an ionic bond, it has more flexibility in the bond length and bond angle compared to the Si—O covalent bond. Additionally, increasing the processing temperature during the processing, thereby promoting atomic molecular vibration, promotes penetration of phosphoric acid into the pores of the small pore zeolite. That is, phosphorus can be permeated into the zeolite by setting the temperature when subjecting a catalyst, to which the Cu—P co-supported zeolite is applied, to calcination or hydrothermal endurance treatment to, for example, preferably 350° C. or higher, more preferably 400° C. or higher, and even more preferably 450° C. or higher. Additionally, in the case where the silica-alumina ratio of the small pore zeolite is low, i.e., in the case where Al content is high, Al is prone to detach from the backbone by de-Al, thus, the pore size of the pores expands, making it easier for phosphoric acid to penetrate into the pores of the small pore zeolite.

Furthermore, in the above production method, the P supporting treatment is performed using a pre-neutralized aqueous phosphoric acid solution, then sufficient co-supporting of Cu and P can be performed, and a high-performance Cu—P co-supported zeolite can be obtained. Due to such reasons, a calcination treatment or a high temperature drying treatment of 200° C. or higher of the Cu supported zeolite or the Cu—P co-supported zeolite is not required after the Cu supporting step, specifically until the P supporting step or the catalyst layer coating step. Accordingly, the above production method can omit a calcination treatment and a high temperature drying treatment that have conventionally been required. In this case, the above production method can be regarded as a mass production method having a high industrial utility, capable of obtaining a Cu—P co-supported zeolite at a relatively low cost in a simpler process with a small environmental load. Further details are given below.

[Preparation Step of Cu Supported Zeolite (S11)]

In this step, a Cu supported zeolite containing at least a small pore size zeolite and an extra-backbone copper atom supported on the small pore size zeolite is prepared. Here, a commercially available Cu supported zeolite can be used, and optionally the desired Cu supported zeolite can be appropriately prepared by allowing Cu to be supported on a Cu unsupported zeolite.

Here, a Cu unsupported small pore size zeolite used as a starting material is a so-called small pore zeolite. The type thereof is not particularly limited, but a small pore zeolite having an oxygen 8-membered ring structure is preferred. Specifically, a small pore zeolite having at least one crystal structure of CHA, AEI, or ERI in measurement by powder X-ray diffractometry is preferred.

The Cu unsupported small pore size zeolite is not particularly limited, but from the viewpoint of penetration and the like of phosphoric acid, preferably has a crystallite size of 10 nm or more and 50 nm or less in measurement by powder X-ray diffractometry, and more preferably 15 nm or more and 50 nm or less, further preferably 15 nm or more and 45 nm or less, most preferably 15 nm or more and 35 nm or less. Among the small pore size zeolites, the zeolite species that tend to have a larger crystallite size than CHA or the like due to the backbone structure (e.g., AEI or ERI) preferably has a crystallite size of 15 nm or more and 100 nm or less, more preferably 20 nm or more and 90 nm or less, further preferably 25 nm or more and 85 nm or less, particularly preferably 30 nm or more and 80 nm or less in measurement by powder X-ray diffractometry.

Furthermore, the Cu unsupported small pore size zeolite is not particularly limited, but from the viewpoint of penetration and the like of phosphoric acid, an aluminosilicate having a silica-alumina ratio of 7 or more and 20 or less, preferably 8 or more and 19 or less, more preferably 9 or more and 18 or less, further preferably 10 or more and 17 or less, particularly preferably 11 or more and less than 16, most preferably 12 or more and less than 16 is preferred. As described above, higher hydrothermal endurance can be exhibited by using a small pore size zeolite with a relatively high intra-backbone Al content (low SAR), and allowing copper in advance to be supported on such a low SAR small pore size zeolite, then protecting excess intra-backbone Al with phosphorus.

The Cu unsupported small pore size zeolite and the Cu supported small pore size zeolite having the above-described physical properties are available commercially, and optionally can be synthesized and prepared by conventionally known methods. For example, the Cu unsupported small pore size zeolite and the Cu supported small pore size zeolite can be obtained by synthesizing a small pore size zeolite (S12) by a conventionally known method, and, if necessary, ion-exchanging the small pore size zeolite to a $NH_4^+$ type and/or $H^+$ type (S13), then allowing the small pore size zeolite to support copper (S14), or the like. Each step is described in detail below.

<Zeolite Synthesis (S12)>

As the method for synthesizing a small pore size zeolite (S12), for example, a method including at least the following steps is widely known: preparing a mixture containing a Si—Al element source and/or a Al element source that contains at least an aluminosilicate having a silica-alumina ratio of 2 or more and less than 20, a Si element source (except for those corresponding to the Si—Al element source), an alkali metal source, an organic structure directing agent, and water; and synthesizing a small pore size zeolite by hydrothermally treating the mixture.

In the mixture preparation step, a mixture containing a Si—Al element source and/or an Al element source, a Si element source, an alkali metal source, an organic structure directing agent (hereinafter, also abbreviated to "SDA"), and water is prepared.

A Si—Al element source known in the art can be used as a starting material without particular limitations as long as the Si—Al element source contains at least an aluminosilicate having a silica-alumina ratio of 2 or more and less than 20. The type thereof is not particularly limited. In this context, the aluminosilicate has a structure where silicon atoms in a silicate are partially replaced with aluminum atoms. The silica-alumina ratio is preferably 5 or more and less than 20, more preferably 7 or more and less than 18. In the present specification, the silica-alumina ratio means a value determined by fluorescent X-ray analysis. Specifically, a sample prepared by pressure-forming approximately 5 g of a sample under 20 t was subjected to measurement using Axios (Spectris plc), and SAR was calculated from the obtained results about % by mass of $Al_2O_3$ and $SiO_2$.

An aluminosilicate represented by the following general formula (I) is preferably used as such an aluminosilicate:

$$xM_2O \cdot Al_2O_3 \cdot mSiO_2 \cdot nH_2O \qquad (I)$$

wherein M represents an alkali metal element, x is a number that satisfies $0 \leq x \leq 1.0$, m is a number that satisfies $2 \leq m < 20$, and n is a number that satisfies $5 \leq n \leq 15$.

In the general formula (I), examples of the alkali metal element include Li, Na, Ka, Rb, and Cs. Among them, Na and K are preferred, and Na is more preferred. The aluminosilicate described above may contain an additional element, for example, an element such as Ga, Fe, B, Ti, Zr, Sn, or Zn, in addition to Si and Al.

In the general formula (I), $0 \leq x \leq 0.6$ is preferred, and $0.1 \leq x \leq 0.5$ is more preferred.

In the general formula (I), m is preferably $5 \leq m < 20$, more preferably $7 \leq m < 18$.

In the general formula (I), n is preferably $6 \leq n \leq 15$, more preferably $7 \leq n \leq 15$.

Among the aluminosilicates having SAR of 2 or more and less than 20, an aluminosilicate that is in a solid powder form at ordinary temperature and pressure (25° C. and 1 atm) is preferably used from the viewpoint of handleability, diffusibility, etc. In the present specification, the powder form conceptually includes a powder (powder comprising primary particles and/or aggregates of the primary particles (secondary particles)) and granules prepared by granulating the primary particles or the secondary particles. The shape of each particle of the aluminosilicate in a powder form is not particularly limited, and, for example, any of spherical, ellipsoidal, crushed, flat, and amorphous shapes may be used.

The average particle size ($D_{50}$) of the aluminosilicate in a powder form is not particularly limited and is preferably 0.01 to 500 μm, more preferably 0.1 to 20 μm. In the present specification, the average particle size $D_{50}$ means a median size measured in a laser diffraction particle size distribution measurement apparatus (e.g., manufactured by Shimadzu Corp., laser diffraction particle size distribution measurement apparatus SALD-3100).

As the aluminosilicate having SAR of 2 or more and less than 20, an aluminosilicate having an amorphous crystal structure in powder X-ray diffractometry or an aluminosilicate having a FAU structure is preferably used. In this context, the amorphous crystal structure in powder X-ray diffractometry means that clear peaks that exhibit specific plane indices are absent in an X-ray diffraction diagram. A commercially available synthetic aluminum silicate can be used as such an amorphous aluminosilicate.

The aluminosilicate having SAR of 2 or more and less than 20 can be synthesized by a method known in the art. A synthetic product can be used as the Si—Al element source. For example, a water-soluble silicate and a water-soluble aluminum salt are reacted under conditions involving a ratio of a silicon atom in the water-soluble silicate to an aluminum atom in the water-soluble aluminum salt (Si/Al) of 1.0 to 11 (preferably 2.5 to 10.8), a liquid temperature of 20 to 90° C. (preferably 40 to 70° C.), pH of 3.8 to 5.0 (preferably 4.0 to 4.7), a reaction solution concentration ($SiO_2+Al_2O_3$) of 70 to 250 g/L (preferably 100 to 180 g/L), and a reaction format of continuous reaction. An aluminum silicate can be separated by solid-liquid separation from the obtained reaction solution, washed, and dried to obtain an aluminosilicate having SAR of 2 or more and less than 20. In this operation, aluminum chloride, aluminum nitrate, aluminum sulfate, sodium aluminate, or the like is preferably used as the water-soluble aluminum salt. Also, a silicic acid alkali metal salt such as sodium silicate or potassium silicate is preferably used as the water-soluble silicate. In this context, sodium silicate No. 1, No. 2, No. 3, or No. 4, sodium metasilicate, sodium orthosilicate, or the like is preferably used as the sodium silicate. The aluminosilicate having a silica-alumina ratio of 2 or more and less than 20 as the Si—Al element source can be used alone or in any combination of two or more at any ratio.

Examples of the Al element source to be used as the starting material include, but are not limited to, aluminum hydroxide, sodium aluminate, aluminum sulfate, pseudoboehmite, boehmite, metal aluminum, and aluminum isopropoxide.

The Al element source can be used alone or in any combination of two or more at any ratio.

Examples of the Si element source to be used as the starting material include, but are not particularly limited to, precipitated silica, colloidal silica, fumed silica, silica gel, sodium silicate (sodium metasilicate, sodium orthosilicate, sodium silicate No. 1, No. 2, No. 3, and No. 4, etc.), and alkoxysilanes such as tetraethoxysilane (TEOS) and trimethylethoxysilane (TMEOS). However, in the present specification, aluminosilicates having SAR of 2 or more and less than 20 correspond to the Si—Al element source mentioned above and are excluded from this Si element source.

The Si element source can be used alone or in any combination of two or more at any ratio.

Examples of the alkali metal source include alkali metal hydroxides such as LiOH, NaOH, KOH, CsOH, and RbOH, aluminates of these alkali metals, and alkali components contained in the Si—Al element source and the Si element source mentioned above. Among them, NaOH or KOH is suitably used. The alkali metal in the mixture is capable of also functioning as an inorganic structure directing agent and therefore tends to easily yield an aluminosilicate excellent in crystallinity.

The alkali metal source can be used alone or in any combination of two or more at any ratio.

At least one member selected from the group consisting of, for example, primary amine, secondary amine, tertiary amine, and quaternary ammonium salt is used as the organic structure directing agent. Specifically, examples of the AEI-type zeolite include hydroxide salts, carbonates, halides, or sulfates, where a quaternary ammonium such as 1,1,3,5-tetramethylpiperidinium or tetraethylammonium is used as a cation. Examples of the ERI-type zeolite include hydroxide salts, carbonates, halides, and sulfates, where a quaternary ammonium such as hexamethonium, tetrapropylammonium, tetraethylammonium, or dimethyldiethylammonium is used as a cation. In addition, examples of the CHA-type zeolite include, but are not particularly limited to: hydroxide salts, halides, carbonates, sulfates, methyl carbonates and sulfates containing an adamantanamine derivative such as N,N,N-trialkyladamantanammonium as a cation; and hydroxide salts, halides, carbonates, methyl carbonates and sulfates containing a benzylamine derivative such as a N,N,N-trialkylbenzylammonium ion, a cyclohexylamine derivative such as a N,N,N-trialkylcyclohexylammonium ion or a N,N,N-methyldiethylcyclohexylammonium ion, a quinuclidinol derivative such as a N-alkyl-3-quinuclidinol ion, an aminonorbornane derivative such as N,N,N-trialkylexoaminonorbornane, or an alkylamine derivative having 1 to 2 carbon atoms such as a tetramethylammonium ion, an ethyltrimethylammonium ion, a diethyldimethylammonium ion, a triethylmethylammonium ion, or a tetraethylammonium ion as a cation. The above cation may usually involve an anion that does no harm to the formation of an aluminosilicate. Examples of such an anion include, but are not particularly limited to, a halogen ion such as $Cl^-$, $Br^-$, and $I^-$, a hydroxide ion, an acetate, a sulfate, and a carboxylate. Among them, a hydroxide ion is preferably used.

Among them, the organic structure directing agent suitable for the synthesis of an CHA-type zeolite is preferably at least one member selected from the group consisting of N,N,N-trimethyladamantanammonium hydroxide (hereinafter, also abbreviated to "TMAdaOH"), N,N,N-trimethyladamantanammonium halide, N,N,N-trimethyladamantanammonium carbonate, N,N,N-trimethyladamantanammonium methyl carbonate, N,N,N-trimethyladamantanammonium hydrochloride, and N,N,N-trimethyladamantanammonium sulfate. As an organic structure directing agent suitable for the synthesis of an AEI-type zeolite, 1,1,3,5-tetramethylpiperidinium is preferred. As an organic structure directing agent suitable for the synthesis of ERI-type zeolite, the combination of hexamethonium and tetraalkylammonium is preferred.

The organic structure directing agent can be used alone or in any combination of two or more at any ratio.

In this mixture preparation step, a mixture (slurry) containing the above-described Si—Al element source and/or the Al source, the Si element source, the alkali metal source, the organic structure directing agent, and water is prepared. In this operation, wet mixing can be performed, if necessary, using a mixer or a stirrer known in the art, for example, a ball mill, a bead mill, a medium stirring mill, or a homogenizer. In the case of performing stirring, the number of rotations is usually preferably on the order of 30 to 2000 rpm, more preferably 50 to 1000 rpm.

In this respect, the content of the water in the mixture can be appropriately set in consideration of reactivity, handleability, etc. and is not particularly limited. The water-silica ratio ($H_2O/SiO_2$ molar ratio) of the mixture is usually 5 or more and 100 or less, preferably 6 or more and 50 or less, more preferably 7 or more and 40 or less. When the water-silica ratio falls within the preferred range described above, there is a tendency to enhance handleability because of easy stirring during the preparation of the mixture or crystallization by hydrothermal synthesis and also to easily obtain high yields by suppressing the formation of by-products or impurity crystals. In this context, the water used can be tap water, RO water, deionized water, distilled water, industrial water, pure water, ultrapure water, or the like according to the desired performance. As for a method for blending water into the mixture, the water may be blended separately from each of the components mentioned above, or may be mixed in advance with these components and blended as an aqueous solution or dispersion of the components.

The silica-alumina ratio of the mixture can also be appropriately set and is not particularly limited. The silica-alumina ratio is usually 5 or more and 80 or less, preferably 8 or more and less than 75, more preferably 10 or more and less than 70. When the silica-alumina ratio falls within the preferred range described above, there is a tendency to easily obtain closely packed crystals and to easily obtain an aluminosilicate that is excellent in thermal endurance in a high-temperature environment or after high-temperature exposure. More specifically, in the synthesis of a CHA-type zeolite, the silica-alumina ratio in the mixture is preferably 5 or more and 50 or less, more preferably 8 or more and less than 45, further preferably 10 or more and less than 40. In the synthesis of an AEI-type zeolite, the silica-alumina ratio in the mixture is preferably 15 or more and 80 or less, more preferably 20 or more and less than 75, further preferably 25 or more and less than 70. In the synthesis of an ERI-type zeolite, the silica-alumina ratio in the mixture is preferably 5 or more and 50 or less, more preferably 8 or more and less than 45, further preferably 10 or more and less than 40.

On the other hand, the hydroxide ion/silica ratio ($OH^-/SiO_2$ molar ratio) of the mixture can also be appropriately set and is not particularly limited. The hydroxide ion/silica ratio is usually 0.10 or more and 0.90 or less, preferably 0.15 or more and 0.80 or less, more preferably 0.20 or more and 0.75 or less. When the hydroxide ion/silica ratio falls within the preferred range described above, there is a tendency to facilitate crystallization and to easily obtain an aluminosilicate that is excellent in thermal endurance in a high-temperature environment or after high-temperature exposure. More specifically, in the synthesis of a CHA-type zeolite, the hydroxide ion/silica ratio in the mixture is preferably 0.10 or more and 0.90 or less, more preferably 0.15 or more and 0.50 or less, further preferably 0.20 or more and 0.40 or less. In the synthesis of an AEI-type zeolite, the hydroxide ion/silica ratio in the mixture is preferably 0.30 or more and 0.90 or less, more preferably 0.40 or more and 0.85 or less, further preferably 0.50 or more and 0.80 or less. In the synthesis of an ERI-type zeolite, the hydroxide ion/silica ratio in the mixture is 0.10 or more and 0.90 or less, preferably 0.15 or more and 0.80 or less, more preferably 0.20 or more and 0.70 or less.

The content of the alkali metal in the mixture can also be appropriately set and is not particularly limited. The molar ratio based on an oxide of the alkali metal (M), i.e., the alkali metal oxide/silica ratio ($M_2O/SiO_2$ molar ratio), is usually 0.01 or more and 0.50 or less, preferably 0.05 or more and 0.30 or less. When the alkali metal oxide/silica ratio falls within the preferred range described above, there is a tendency to promote crystallization by a mineralizing effect and also to easily obtain high yields by suppressing the formation of by-products or impurity crystals.

On the other hand, the organic structure directing agent/silica ratio (organic structure directing agent/$SiO_2$ molar ratio) of the mixture can also be appropriately set and is not particularly limited. The organic structure directing agent/silica ratio is usually 0.05 or more and 0.70 or less, preferably 0.07 or more and 0.60 or less, more preferably 0.09 or more and 0.55 or less. When the organic structure directing agent/silica ratio falls within the preferred range described above, there is a tendency to facilitate crystallization and to easily obtain, at low cost, an aluminosilicate that is excellent in thermal endurance in a high-temperature environment or after high-temperature exposure. More specifically, in the synthesis of a CHA-type zeolite, the organic structure directing agent/silica ratio in the mixture is 0.05 or more and 0.40 or less, preferably 0.07 or more and 0.30 or less, more preferably 0.09 or more and 0.25 or less. In the synthesis of an AEI-type zeolite, the organic structure directing agent/silica ratio in the mixture is 0.05 or more and 0.40 or less, preferably 0.07 or more and 0.30 or less, more preferably 0.09 or more and 0.25 or less. In the synthesis of an ERI-type zeolite, the organic structure directing agent/silica ratio in the mixture is 0.20 or more and 0.70 or less, preferably 0.30 or more and 0.65 or less, more preferably 0.40 or more and 0.60 or less.

The mixture mentioned above may further contain a seed crystal of the aluminosilicate having a desired backbone structure from the viewpoint of promotion of crystallization, etc. The seed crystal blended therein promotes the crystallization for the desired backbone structure, and tends to easily yield a high-quality aluminosilicate. In this context, the seed crystal used is not particularly limited as long as the seed crystal is a crystal having a desired backbone structure. For example, a seed crystal of an aluminosilicate having at least one backbone structure of CHA, AEI, or ERI can be used. The silica-alumina ratio of the seed crystals is arbitrary and is preferably equal or equivalent to the silica-alumina ratio of the mixture. The silica-alumina ratio of the seed crystals is preferably 5 or more and 80 or less, more preferably 8 or more and less than 75, further preferably 10 or more and less than 70, from such a viewpoint. The silica-alumina ratio of the seed crystal can also be appropriately set depending on the zeolite of the desired backbone structure, and the preferred range thereof is similar to that described above.

In this context, the seed crystals used can be not only a separately synthesized aluminosilicate but a commercially available aluminosilicate. As a matter of course, a naturally produced aluminosilicate can also be used. An aluminosilicate synthesized according to the present invention can also be used as the seed crystals. The cation type of the seed crystals is not particularly limited, and, for example, sodium type, potassium type, ammonium type, or proton type can be used.

In this context, the particle size ($D_{50}$) of the seed crystal used is not particularly limited and is desirably relatively small from the viewpoint of promoting the crystallization for the desired crystal structure. The particle size is usually 0.5 nm or more and 5 μm or less, preferably 1 nm or more and 3 μm or less, more preferably 2 nm or more and 1 μm or less. The amount of the seed crystals blended can be appropriately set according to the desired crystallinity and is not particularly limited. The amount of the seed crystals blended is preferably 0.05 to 30% by mass, more preferably 0.1 to 20% by mass, further preferably 0.5 to 10% by mass, with respect to the mass of $SiO_2$ in the mixture.

Step of hydrothermally treating mixture involves heating the mixture mentioned above in a reaction container for hydrothermal synthesis to obtain a crystallized aluminosilicate.

A reaction container known in the art can be appropriately used in this hydrothermal synthesis as long as the reaction container is a hermetically sealable pressure-tight container that may be used in hydrothermal synthesis. The type thereof is not particularly limited. For example, a hermetically sealable heat-resistant and pressure-tight container such as an autoclave equipped with a stirring apparatus, a heat source, a pressure gauge, and a safety valve is preferably used. The crystallization of the aluminosilicate may be performed in a state where the mixture mentioned above (starting material composition) is left standing. The crystallization is preferably performed in a state where the mixture mentioned above (starting material composition) is mixed by stirring, from the viewpoint of enhancing the homogeneity of the resulting aluminosilicate. This operation is usually preferably performed at the number of rotations on the order of 30 to 2000 rpm, more preferably 50 to 1000 rpm.

The treatment temperature (reaction temperature) of the hydrothermal synthesis is not particularly limited and is usually 100° C. or higher and 200° C. or lower, preferably 120° C. or higher and 190° C. or lower, more preferably 125° C. or higher and 180° C. or lower, from the viewpoint of the crystallinity of the resulting aluminosilicate, cost efficiency, etc. The processing temperature may be appropriately set depending on the zeolite of the desired backbone structure. For example, in the CHA-type and AEI-type zeolites, the treatment temperature is particularly preferably 150° C. or higher and 180° C. or lower, and in the ERI-type zeolite, the treatment temperature is particularly preferably 100° C. or higher and 150° C. or lower.

The treatment time (reaction time) of the hydrothermal synthesis can be a time long enough for the crystallization and is not particularly limited. The treatment time is usually 1 hour or longer and 20 days or shorter, preferably 4 hours or longer and 10 days or shorter, more preferably 12 hours or longer and 8 days or shorter, from the viewpoint of the crystallinity of the resulting aluminosilicate, cost efficiency, etc.

The treatment pressure of the hydrothermal synthesis is not particularly limited, and a spontaneous pressure suffices which is generated by heating the mixture added into the reaction container to the temperature range described above. In this respect, an inert gas such as nitrogen or argon may be introduced, if necessary, into the container.

The hydrothermal treatment can be performed in this way to obtain a crystallized aluminosilicate. In this operation, solid-liquid separation treatment, water washing treatment, drying treatment to remove water, for example, at a temperature on the order of 50 to 150° C. in the atmosphere, or the like may be performed, if necessary, according to a routine method.

The aluminosilicate thus obtained may contain a structure directing agent, an alkali metal, etc. within pores or the like. Therefore, a removal step of removing them is preferably performed, if necessary. The removal of an organic structure directing agent, an alkali metal, etc. can be performed according to a routine method and is not particularly limited by its method. For example, liquid-phase treatment using an acidic aqueous solution, liquid-phase treatment using an aqueous solution containing an ammonium ion, liquid-phase treatment using a chemical solution containing a decomposition component of an organic structure directing agent, exchange treatment using a resin or the like, calcination treatment can be performed. These treatments can be performed in any combination. Among them, calcination treatment is preferably used as the removal of an organic structure directing agent, an alkali metal, etc. from the viewpoint of production efficiency, etc.

The treatment temperature in the calcination treatment (calcination temperature) can be appropriately set according to the starting materials used, etc. and is not particularly limited. The treatment temperature is usually 300° C. or higher and 1000° C. or lower, preferably 400° C. or higher and 900° C. or lower, more preferably 430° C. or higher and 800° C. or lower, further preferably 480° C. or higher and 750° C. or lower, from the viewpoint of, for example, maintaining crystallinity while reducing the residual rates of the structure directing agent, the alkali metal, etc. The calcination treatment is preferably performed in an oxygen-containing atmosphere and can be performed, for example, in the atmosphere.

The treatment time in the calcination treatment (calcination time) can be appropriately set according to the treatment temperature and cost efficiency, etc. and is not particularly limited. The treatment time is usually 0.5 hours or longer and 72 hours or shorter, preferably 1 hour or longer and 48 hours or shorter, more preferably 3 hours or longer and 40 hours or shorter.

<Ion-Exchange (S13)>

The aluminosilicate thus crystallized may have a metal ion such as an alkali metal ion on its ion-exchange site. In this context, an ion-exchange step of performing ion-exchange can be performed according to the desired performance. In this ion-exchange step, the metal ion can be ion-exchanged to a nonmetal cation such as an ammonium ion ($NH_4^+$) or a proton ($H^+$) according to a routine method. For example, the aluminosilicate can be ion-exchanged to ammonium type by liquid-phase treatment using an aqueous solution containing an ammonium ion, such as an aqueous ammonium nitrate solution or an aqueous ammonium chloride solution. Alternatively, the aluminosilicate can be ion-exchanged with ammonia and then ion-exchanged to proton type by calcination treatment. In the production method described above, it is preferred that the aluminosilicate is an ammonium ion ($NH_4^+$) type from the viewpoint of omitting a calcination treatment and a high temperature drying treatment by using a neutralized treatment solution in the P supporting treatment. The aluminosilicate thus obtained may be further subjected to a treatment such as reduction of the amount of an acid, as needed. The reduction treatment of the amount of an acid can be performed by, for example, silylation, steam treatment, or dicarboxylic acid treatment. Such reduction treatment of the amount of an acid and change in composition can be performed according to a routine method.

<Supporting of Cu (S14)>

Here, Cu is supported on the above-described (Cu unsupported) aluminosilicate to obtain a Cu supported zeolite. The Cu supporting treatment can be performed according to a routine method. By supporting Cu in this manner, the aluminosilicate can function as a catalyst for various purposes. Optionally, transition metal elements other than Cu, such as iron (Fe) and tungsten (W), can also be supported.

Supporting treatment of the transition metal including CU can be performed according to a routine method. This treatment can be performed, for example, by contacting the aluminosilicate mentioned above with an elemental substance or a compound of a transition metal or a transition metal ion or the like. This transition metal supporting method can be any method of allowing the transition metal to be retained in at least any of the ion-exchange site and the pores of the aluminosilicate. The transition metal can be supplied as an inorganic acid salt of the transition metal, for example, a sulfate, a nitrate, an acetate, a chloride, an oxide, a composite oxide, or a complex salt, of the transition metal. Among these, it is preferred that the transition metal is supplied as an inorganic salt of a strong acid such as sulfate, nitrate, and the like, because the above-described production method uses a neutralized treatment solution in the P supporting treatment. Specific examples of the method include, but are not particularly limited to, an ion-exchange method, a method of evaporation to dryness, a precipitation supporting method, a physical mixing method, a backbone substitution method and an impregnation supporting method. After the transition metal supporting treatment, solid-liquid separation treatment, water washing treatment, drying treatment to remove water, for example, at a temperature on the order of 50 to 150° C. in the atmosphere, or the like can be performed, if necessary, according to a routine method.

The aluminosilicate may be allowed, if necessary, to support a platinum group metal (PGM) such as platinum, palladium, rhodium, or iridium. A method for supporting a noble metal element or a platinum group metal is not particularly limited, and an approach known in the art can be applied thereto. For example, a salt solution containing a noble metal element or a platinum group metal is prepared. The aluminosilicate can be impregnated with this salt-containing solution, followed by calcination to support the noble metal element or the platinum group metal. The salt-containing solution is not particularly limited and is preferably an aqueous nitrate solution, a dinitrodiamine nitrate solution, an aqueous chloride solution, or the like. The calcination treatment is not particularly limited and is preferably performed at 350° C. to 1000° C. for approximately 1 to 12 hours. Prior to the high-temperature calcination, it is preferred to perform drying under reduced pressure using a vacuum dryer or the like, followed by drying treatment at about 50° C. to 180° C. for approximately 1 to 48 hours.

Next, Cu unsupported zeolite and Cu supported zeolite prepared in this manner are described. The Cu unsupported zeolite and Cu supported zeolite are crystalline aluminosilicates classified with various structural codes in IZA. Preferably, they are crystalline aluminosilicates classified by at least one structural code of CHA, AEI, or ERI. These crystalline zeolites have aluminum (Al) and silicon (Si) as main backbone metal atoms and have a structure composed of a network of these metal atoms and oxygen (O). The structure is characterized by X-ray diffraction data.

The particle sizes of the Cu unsupported zeolite and Cu supported zeolite may vary depending on the synthesis conditions, etc. and thus are not particularly limited. Their average particle sizes ($D_{50}$) are, however, preferably 0.01 μm to 20 μm, more preferably 0.02 to 20 μm, from the viewpoint of surface area, handleability, etc.

The silica-alumina ratio of the Cu unsupported zeolite and Cu supported zeolite can also be appropriately set, and is not particularly limited, but preferably 7 or more and 20 or less, more preferably 8 or more and 19 or less, further preferably 9 or more and 18 or less, particularly preferably 10 or more and 17 or less, especially preferably 11 or more and less than 16, most preferably 12 or more and less than 16, from the viewpoint of thermal endurance in a high-temperature environment or after exposure to high temperature, and catalytic activity, or the like. When the silica-alumina ratio of the aluminosilicate falls within the above-described preferred numeric range, there is a tendency to easily obtain a catalyst or a catalyst support having thermal endurance and catalytic activity balanced at a high level.

Meanwhile, the content of Cu in the Cu supported small pore size zeolite is not particularly limited and is preferably 0.1 to 10% by mass, more preferably 0.5 to 8% by mass, with respect to the total amount.

The atom ratio of the transition metal to aluminum (transition metal/aluminum) in the Cu supported small pore size zeolite is not particularly limited and is preferably 0.01 to 1.0, more preferably 0.05 to 0.7, further preferably 0.1 to 0.5.

[P Supporting Step (S21)]

Here, P is allowed to be co-supported to a Cu supported small pore size zeolite. The supporting method of phosphorus can be performed by preparing a treatment solution containing at least phosphoric acid and an organic base in advance (S22), and adding the treatment solution to the Cu supported small pore size zeolite. By co-supporting Cu and P in this manner, the thermal endurance as a catalyst for various purposes can be improved. Examples of the catalyst purposes include, but are not particularly limited to, a catalyst for exhaust gas purification, a catalyst for lower olefin production from alcohols or ketones, a catalyst for cracking, a catalyst for dewaxing, and a catalyst for isomerization. In particular, the Cu—P co-supported zeolite is capable of maintaining relatively high adsorption performance, catalyst performance, etc. even in a high-temperature environment or after exposure to high temperature, thus has a great potential as a nitrogen oxide reduction catalyst. Optionally, transition metal elements other than Cu, such as iron (Fe) and tungsten (W), can also be supported.

(Preparation of Treatment Solution S22)

The treatment solution used here is not particularly limited in the composition and physical properties as long as the treatment solution contains at least phosphoric acid and an organic base. Here, phosphoric acid means orthophosphoric acid, and optionally may be used in combination with phosphoric acids such as pyrophosphoric acid. As the treatment solution, an aqueous solution containing at least phosphoric acid, an organic base and water is preferably used from the viewpoint of increasing the supporting efficiency of phosphorus.

As described above, the production method described above uses a so-called pre-neutralized aqueous phosphoric acid solution, thereby suppressing the flow of Cu during the P supporting treatment described above. As a result, Cu supported on the zeolite can be maintained with high efficiency while allowing P to be co-supported with high efficiency. From such viewpoints, the pH of the treatment solution is not particularly limited, but preferably 4 to 9, more preferably 5 to 8.

The organic base is not particularly limited in type as long as the organic base is capable of realizing a pre-neutralized aqueous phosphoric acid solution, and can be appropriately selected from known organic bases. However, when the organic base is a molecule or ion susceptible to coordination with Cu, Cu may be complexed, and when the organic base is a strong base, it may promote copper hydroxide production. From such viewpoints, the organic base is preferably a water-soluble monocyclic compound having a pKa (25° C.) of 5 or more and 9 or less, more preferably a pKa (25° C.) of 6 or more and 8.5 or less.

Suitable examples of the organic base include water-soluble heterocyclic compounds. Examples of such heterocyclic compounds include 5- or 6-membered heterocyclic compounds, and more preferably 6-membered heterocyclic compounds. Specific examples of the organic base include, but are not particularly limited to, pyridine, 2-picoline, 3-picoline, 4-picoline, 2,6-dimethylpyridine, N-methylmorpholine, N-ethylmorpholine, imidazole, and morpholine.

The treatment conditions of the P supporting treatment can be performed according to a routine method. For example, the P supporting treatment can be performed by impregnating and contacting the Cu supported small pore size zeolite described above with the treatment solution described above. The thermal treatment temperature after the P supporting treatment is not particularly limited as long as it is equal to or higher than the room temperature (25° C.), but preferably 40° C. or higher, more preferably 60° C. or higher, and further preferably 80° C. or higher from the viewpoint of increasing the supported amount of phosphorus, and the upper limit thereof is not particularly limited, but is 180° C. or lower as a standard, and preferably 150° C. or lower.

The Cu—P co-supported zeolite of the present embodiment thus obtained contains at least a small pore size zeolite and an extra-backbone copper atom and an extra-backbone phosphorus atom supported on the small pore size zeolite, where Cu and P are highly efficiently co-supported on the zeolite, thereby thermal endurance is enhanced and excellent catalyst performance is exhibited.

The silica-alumina ratio of the Cu—P co-supported zeolite of the present embodiment is preferably 7 or more and 20 or less, more preferably 8 or more and 19 or less, further preferably 9 or more and 18 or less, particularly preferably 10 or more and 17 or less, especially preferably 11 or more and less than 16, most preferably 12 or more and less than 16, from the viewpoint of thermal endurance and catalyst performance. The value of SAR of the Cu—P co-supported zeolite can be appropriately adjusted depending on the SAR of the small pore size zeolite used, the SAR or the amount of use of the Si—Al element source or the Si element source in synthesis of the small pore size zeolite, the synthesis temperature or time, or the like.

The ratio of the copper atom to a T atom (Cu/T) of the Cu—P co-supported zeolite of the present embodiment is preferably 0.005 or more and 0.060 or less, more preferably 0.010 or more and 0.060 or less, further preferably 0.020 or more and 0.055 or less, particularly preferably 0.030 or more and 0.050 or less, from the viewpoint of thermal endurance and catalyst performance. High Cu content tends to improve low temperature performance, but too much Cu content tends to reduce high temperature performance. Thus, the Cu/T ratio may be adjusted as appropriate according to the desired performance. Here, the T atom means a tetrahedral atom presents in the zeolite backbone, and in the present specification means the sum of Si atoms and Al atoms. The Cu/T value of the Cu—P co-supported zeolite can be adjusted to a desired value by appropriately adjusting the amount of Cu salt blended, the supported time and so on during the Cu supporting treatment according to the SAR of the small pore size zeolite used.

The ratio of the phosphorus atom to the T atom (P/T) of the Cu—P co-supported zeolite of the present embodiment is preferably 0.005 or more and 0.060 or less, more preferably 0.010 or more and 0.060 or less, further preferably 0.011 or more and 0.050 or less, from the viewpoint of thermal endurance and catalyst performance. High P content tends to improve low temperature performance, but too much P content tends to reduce high temperature performance and low temperature performance. Thus, the P/T ratio may be adjusted as appropriate according to the desired performance. The P/T value of the Cu—P co-supported zeolite can be adjusted to a desired value according to the SAR of the small pore size zeolite used, by appropriately adjusting the amount of phosphoric acid blended, the supported time and so on during the P supporting treatment. For example, the P/T value of the Cu—P co-supported CHA-type zeolite is particularly preferably 0.020 or more and 0.055 or less, most preferably 0.030 or more and 0.050 or less.

The ratio of the phosphorus atom to the Cu atom (P/Cu) of the Cu—P co-supported zeolite of the present embodiment is preferably 0.1 or more and 3 or less, more preferably 0.3 or more and 2.5 or less, further preferably 0.5 or more and 2.0 or less, and particularly preferably 0.6 or more and 1.5 or less, from the reasons described above. At P/Cu of 1.0 or more, the excess intra-backbone Al of the Cu supported zeolite tends to be highly protected by phosphorus and exhibit particularly remarkable hydrothermal endurance. The P/Cu value of the Cu—P co-supported zeolite can be adjusted to a desired value according to the SAR of the small pore size zeolite used, by appropriately adjusting the amount of Cu salt blended, the supported time or the like during the Cu supporting treatment, and the amount of phosphoric acid blended, the supported time or the like during the P supporting treatment. For example, P/Cu of the Cu—P co-supported CHA-type zeolite is especially preferably 0.7 or more and 1.5 or less, more especially preferably 1.0 or more and 1.5 or less, most preferably 1.1 or more and 1.5 or less.

The Cu—P co-supported zeolite of the present embodiment preferably has a crystallite size of 10 nm or more and 100 nm or less, more preferably 12 nm or more and 80 nm or less, further preferably 15 nm or more and 70 nm or less, and particularly preferably 20 nm or more and 60 nm or less in measurement by powder X-ray diffractometry, from the viewpoint of thermal endurance and catalyst performance. The crystallite size of the Cu—P co-supported zeolite may be appropriately set depending on the zeolite of the desired backbone structure. For example, in the case of a Cu—P co-supported CHA-type zeolite, the Cu—P co-supported zeolite especially preferably has a crystallite size of 10 nm or more and 50 nm or less, more especially preferably 15 nm or more and 50 nm or less, particularly preferably 15 nm or more and 45 nm or less, and most preferably 15 nm or more and 35 nm or less in measurement by powder X-ray diffractometry, from the viewpoint of thermal endurance and catalyst performance.

The particle size of the Cu—P co-supported zeolite of the present embodiment may vary depending on the synthesis conditions or the like, and thus are not particularly limited. Their average particle sizes ($D_{50}$) are, however, preferably 0.01 μm to 20 μm, more preferably 0.02 to 20 μm, from the viewpoint of surface area, handleability, or the like.

After the P supporting treatment, if necessary, a solid-liquid separation treatment, a water washing treatment, a drying treatment to remove water and organic base at, for example, a temperature of about 50 to 150° C. in the atmosphere or the like can be performed according to a routine method. At this time, the composition of the Cu—P co-supported zeolite after removing water and organic base is preferably a composition represented by the following general formula (I) from the viewpoint of catalytic activity and the like:

$$SiO_2 \cdot xAl_2O_3 \cdot yCuO \cdot zP_2O_5 \quad \text{(I)}$$

(wherein, $0.05 \leq x \leq 0.14$, $0.005 \leq y \leq 0.06$, $0.005 \leq z \leq 0.06$.)

Here, the Cu—P co-supported zeolite after the P supporting treatment can optionally be further subjected to a calcination treatment of 350° C. or higher or a high temperature drying treatment of 200° C. or higher. However, in the above-described production method such a calcination treatment or a high temperature drying treatment is not necessarily required, thus there is a process advantage. In other words, the Cu—P co-supported zeolite can be used as-is as the starting material of the catalytic slurry, and in this case, one or two or more calcination processes can be omitted from the conventional method, thus the Cu—P co-supported zeolite can be supplied in a large quantity at a relatively low cost in a simpler process with a small environmental load.

[Purpose]

As described above in detail, the Cu—P co-supported zeolite of the present embodiment can be suitably used for purposes such as an adsorbent, a separating agent, an ion exchanger, an adsorbent, a catalyst, and a catalyst support. In particular, the Cu—P co-supported zeolite of the present embodiment is excellent in thermal endurance and is capable of maintaining relatively high adsorption performance, catalyst performance and the like even in a high-temperature environment or after exposure to high temperature. Thus, the Cu—P co-supported zeolite of the present embodiment can be especially suitably used for purposes of being used in a high-temperature environment or exposed to high temperature. Examples of the adsorbent for use in a high-temperature atmosphere include, but are not particularly limited to, water adsorbents, hydrocarbon adsorbents, and nitrogen oxide adsorbents. Examples of the catalyst for use in a high-temperature and high-humidity atmosphere include, but are not particularly limited to, catalysts for exhaust gas purification which purify exhaust gas from diesel automobiles, gasoline automobiles, jet engines, boilers, gas turbines, or the like and catalyst supports thereof, and nitrogen oxide catalysts and catalyst supports thereof (direct nitrogen oxide decomposition catalysts, nitrogen oxide reduction catalysts, their catalyst supports, etc.).

The Cu—P co-supported zeolite is especially useful as a catalyst for exhaust gas purification and is particularly suitably used as a selective catalytic reduction catalyst (SCR catalyst) that uses ammonia, urea, organic amines or the like as a reducing agent. That is, the Cu—P co-supported zeolite is excellent in thermal endurance, and thus capable of maintaining a high nitrogen oxide reduction rate even in a high-temperature range of 400° C. or higher and 600° C. or lower after hydrothermal endurance treatment. In contrast, conventional copper-supported zeolites known in the art largely reduce their nitrogen oxide reduction rate in the same high-temperature range. As is evident from the contrast therebetween, the Cu—P co-supported zeolite mentioned above is especially remarkably effective in terms of exhibiting a high reduction rate in a high-temperature range when used as a SCR catalyst.

The hydrothermal endurance treatment means an aging treatment of a catalyst which is performed in order to allow the catalyst to exert stable catalyst performance in practical use. In the present specification, the hydrothermal endurance treatment is performed upon evaluating the nitrogen oxide reduction rate by a treatment of 100 hours at 650° C. or a treatment of 40 hours at 750° C. under a water vapor environment of a moisture content of 10% by volume. The nitrogen oxide reduction rate after the hydrothermal endurance treatment at 650° C. is preferably 65% or more, more preferably 70% or more, preferably 75% or more, further preferably 80% or more, most preferably 85% or more at 500° C. Further, the nitrogen oxide reduction rate after the hydrothermal endurance treatment at 750° C. is preferably 65% or more, more preferably 70% or more, preferably 75% or more, further preferably 78% or more, most preferably 80% or more at 500° C.

In a preferred embodiment, the Cu—P co-supported zeolite mentioned above exerts the nitrogen oxide reduction rate substantially equivalent to conventional copper-supported zeolite known in the art even in a low-temperature range of 150° C. or higher and lower than 400° C. Specifically, after the hydrothermal endurance treatment at 650° C., the rate of nitrogen oxide reduction is preferably 70% or more, more preferably 75% or more, further preferably 80% or more, particularly preferably 83% or more, most preferably 86% or more, at 200° C. Specifically, after the hydrothermal endurance treatment at 750° C., the nitrogen oxide reduction rate is preferably 65% or more, more preferably 70% or more, further preferably 76% or more, particularly preferably 78% or more, most preferably 80% or more, at 200° C.

[Catalyst for Exhaust Gas Purification, Exhaust Gas Purification Apparatus, and Method for Purifying Exhaust Gas]

For use as a catalyst for exhaust gas purification or a catalyst support thereof, the Cu—P co-supported zeolite of the present embodiment can be used directly as a powder. Alternatively, for example, the powder may be formed into any shape and thereby used as a particulate or pellet-like formed article. In this preparation of the formed article, various dispersion apparatuses, kneading apparatuses, and forming apparatuses known in the art can be used. Furthermore, the Cu—P co-supported zeolite of the present embodiment can also be retained (supported), for use, by a catalyst support including ceramic monolith supports made of cordierite, silicon carbide, silicon nitride, or the like, metal honeycomb supports and wire mesh supports made of stainless or the like, and steel wool-like knit wire supports. These supports can be used each alone or in any combination of two or more at any ratio. Various coating methods, wash coat methods, and zone coat methods known in the art can be utilized for retaining the Cu—P co-supported zeolite by the catalyst support.

The Cu—P co-supported zeolite of the present embodiment can be blended, for use, into a catalyst layer of a catalyst converter for exhaust gas purification. This can be achieved, for example, by disposing a catalyst layer containing the Cu—P co-supported zeolite of the present embodiment on a catalyst support such as a monolith support. The catalyst area of the catalyst converter for exhaust gas purification may have only one catalyst layer as a single layer or may have a laminate consisting of two or more catalyst layers. Alternatively, the catalyst area may have any laminate of one or more catalyst layers in combination with one or more additional layers known in the art. For example, when the catalyst converter for exhaust gas purification has a multilayer configuration having at least an oxygen storage layer and a catalyst layer on the catalyst support, the catalyst converter for exhaust gas purification can be excellent in heat resistance and ternary purification performance by containing the Cu—P co-supported zeolite of the present embodiment at least in the catalyst layer. The layer configuration is preferably two or more layers in consideration of the trends of increased regulation of exhaust gas.

A method for forming the catalyst layer can be performed according to a routine method and is not particularly limited. As one example, the Cu—P co-supported zeolite of the present embodiment, an aqueous medium, and an optional binder, additional catalyst, promoter particles, OSC material, matrix particles, additive, etc. known in the art are mixed at the desired blending ratio to prepare a catalytic slurry (a slurry-like mixture). The obtained slurry-like mixture can be applied to the surface of the catalyst support, dried, and calcined. In this respect, if necessary, an acid or a base can be blended into the mixture for pH adjustment, or a surfactant, a resin for dispersion, or the like can be blended thereinto for viscosity adjustment or improvement in slurry dispersibility. Crushing mixing using a ball mill or the like may be applied to a method for mixing the slurry, and other methods for crushing or mixing may be applied thereto.

A method for applying the slurry-like mixture to the catalyst support can be performed according to a routine method and is not particularly limited. Various coating methods, wash coat methods, and zone coat methods known in the art can be applied thereto. After the application of the slurry-like mixture, drying and calcination can be performed according to a routine method to obtain a catalyst converter for exhaust gas purification having a catalyst layer containing the Cu—P co-supported zeolite of the present embodiment.

The catalyst converter for exhaust gas purification mentioned above can be placed in the exhaust systems of various engines. The number and position of the catalyst converter for exhaust gas purification to be installed can be appropriately designed according to the regulation of exhaust gas. For example, under strict regulation of exhaust gas, the catalyst converter for exhaust gas purification can be placed at two or more positions, which can be underfloor positions immediately below the exhaust system and in the rear of a catalyst. The catalyst composition or the catalyst converter for exhaust gas purification containing the Cu—P co-supported zeolite of the present embodiment can exert an excellent effect on the purification reaction of CO, HC, or NOx even in a high-temperature environment. Specifically, the Cu—P co-supported zeolite of the present embodiment can purify exhaust gas containing at least one member selected from the group consisting of HC, CO, and NOx, by contact with the exhaust gas.

EXAMPLES

Hereinafter, the features of the present invention will be described further specifically with reference to Test Examples, Examples, and Comparative Examples. However, the present invention is not intended to be limited by them by any means. Specifically, materials, amounts used, ratios, treatment contents, treatment procedures, etc. given below in Examples can be appropriately changed or modified without departing from the spirit of the present invention. Various production conditions or values of evaluation results in Examples below mean the preferred upper limit values or the preferred lower limit values in the embodiments of the present invention. Preferred ranges may be ranges defined by the combinations of the upper limit or lower limit values described above with values of Examples described below, or the combinations of the values of Examples.

Example 1

<Preparation of Mixture>

To 1,220.0 g of an aqueous solution containing 25% N,N,N-trimethyladamantanammonium hydroxide (hereinafter, also referred to as a "TMAdaOH 25% aqueous solution"), 1,710 g of pure water, 590 g of an amorphous synthetic aluminum silicate in a solid powder form (manufactured by Kyowa Chemical Industry Co., Ltd., synthetic aluminum silicate, trade name: KYOWAAD® 700SEN-S, SAR: 9.7) as the Si—Al element source, 880.0 g of colloidal silica (manufactured by Nissan Chemical Corporation, trade name: Snowtex® 40, $SiO_2$ content ratio: 39.7% by mass) as the Si element source, 74.0 g of sodium hydroxide (manufactured by FUJIFILM Wako Pure Chemical Corporation, content: 97% or more), and 31.0 g of chabazite seed crystals (SAR16) were added, and the mixture was thoroughly mixed to obtain a starting material composition (mixture). The composition of the starting material composition was $SiO_2:0.053Al_2O_3:0.119TMAdaOH:0.095Na_2O:15.1H_2O$ in terms of molar ratio.

<Synthesis of CHA-Type Aluminosilicate>

This starting material composition (mixture) was added into a 5,000 cc stainless autoclave, which was then hermetically sealed. Then, the starting material composition was heated to 170° C. with stirring at 300 rpm, and kept for 55 hours. The product after this hydrothermal treatment was separated by solid-liquid separation. The obtained solid phase was washed with a sufficient amount of water and dried at 105° C. to obtain the product. As a result of conducting powder X-ray diffractometry, the product was confirmed to be a pure CHA-type aluminosilicate, i.e., a single phase of a chabazite-type synthetic zeolite. As a result of conducting fluorescent X-ray analysis, the obtained CHA-type aluminosilicate of Example 1 had a silica-alumina ratio ($SiO_2/Al_2O_3$) of 15.5.

<Calcination and Ion-Exchange of CHA-Type Aluminosilicate>

The obtained CHA-type aluminosilicate of Example 1 was calcined at 600° C., then ion-exchanged two repetitive times using an aqueous ammonium nitrate solution containing ammonium nitrate in the same amount thereas and a 10-fold amount of water, then washed with a sufficient amount of pure water, and dried at 120° C. to obtain a NH$_4^+$-type CHA-type aluminosilicate (NH$_4^+$-type CHA-type zeolite).

<Supporting of Cu, Supporting of P>

170 g of the obtained NH$_4^+$ type CHA-type aluminosilicate of Example 1 was impregnated with a mixture of 41 g of an aqueous solution containing 50% copper nitrate trihydrate and 45 g of water, and the mixture was then dried at 100 to 120° C. The dried product was impregnated with a mixture of 12 g of 85% phosphoric acid, 17 g of morpholine and 35 g of water (treatment solution, pH=7.5) under an environment of 25° C., and the mixture was dried at 100 to 120° C. again to obtain a Cu—P co-supported CHA-type aluminosilicate (Cu—P co-supported CHA-type zeolite) of Example 1. The supported amount of Cu in terms of solid content measured by fluorescent X-ray analysis was 3.4% by mass and the supported amount of P was 2.2% by mass.

<Production of Honeycomb Laminated Catalyst>

Then, the procedures were performed in the same way as in Example 1 except for using the obtained Cu—P co-supported CHA-type aluminosilicate of Example 1 to produce a honeycomb laminated catalyst of Example 1.

Example 2

<Preparation of Mixture>

To 930.0 g of a TMAdaOH 25% aqueous solution, 2,080 g of pure water, 826 g of an amorphous synthetic aluminum silicate in a solid powder form (manufactured by Kyowa Chemical Industry Co., Ltd., synthetic aluminum silicate, trade name: KYOWAAD® 700PEL, SAR: 10.0) as the Si—Al element source, 320.0 g of colloidal silica (manufactured by Nissan Chemical Corporation, trade name: Snowtex® 40, SiO$_2$ content ratio: 39.7%) as the Si element source, 133.0 g of 48% sodium hydroxide (manufactured by KANTO KAGAKU), and 23.0 g of chabazite seed crystals (SAR10) were added, and the mixture was thoroughly mixed to obtain a starting material composition (mixture). The composition of the starting material composition was SiO$_2$:0.081Al$_2$O$_3$:0.100TMAdaOH:0.100Na$_2$O:16.0H$_2$O in terms of molar ratio.

<Synthesis of CHA-Type Aluminosilicate>

This starting material composition (mixture) was added into a 5,000 cc stainless autoclave, which was then hermetically sealed. Then, the starting material composition was heated to 160° C. with stirring at 300 rpm, kept for 48 hours, and then further kept at 170° C. for 24 hours. The product after this hydrothermal treatment was separated by solid-liquid separation. The obtained solid phase was washed with a sufficient amount of water and dried at 105° C. to obtain a product. As a result of conducting powder X-ray diffractometry analysis, the product was confirmed to be a pure CHA-type aluminosilicate, i.e., a single phase of a chabazite-type synthetic zeolite. As a result of conducting fluorescent X-ray analysis, the obtained CHA-type aluminosilicate of Example 2 had a silica-alumina ratio (SiO$_2$/Al$_2$O$_3$) of 11.3.

<Ion Exchange of CHA-Type Aluminosilicate>

The procedures were performed in the same way as in Example 1 except for using the obtained CHA-type aluminosilicate of Example 2.

<Supporting of Cu, Supporting of P>

120 g of the obtained NH$_4^+$ type CHA-type aluminosilicate of Example 2 was impregnated with a mixed solution of 34.6 g of an aqueous solution containing 50% copper nitrate trihydrate and 26 g of water, and the mixture was then dried at 105° C. The dried product was impregnated with a mixture of 8 g of 85% phosphoric acid, 12 g of morpholine and 40 g of water (treatment solution, pH=7.6) under an environment of 25° C., and the mixture was dried at 100 to 120° C. again to obtain a Cu—P co-supported CHA-type aluminosilicate (Cu—P co-supported CHA-type zeolite) of Example 2. The supported amount of Cu in terms of solid content measured by fluorescent X-ray analysis was 3.7% by mass and the supported amount of P was 2.0% by mass.

<Production of Honeycomb Laminated Catalyst>

Then, the procedures were performed in the same way as in Example 1 except for using the obtained Cu—P co-supported CHA-type aluminosilicate of Example 2 to produce a honeycomb laminated catalyst of Example 2.

Comparative Example 1

<Preparation of Mixture>

To 560.0 g of a TMAdaOH 25% aqueous solution, 3,735 g of pure water, 52.0 g of sodium aluminate in a solid powder form (manufactured by FUJIFILM Wako Pure Chemical Corporation) as the Al element source, 109.0 g of a sodium silicate solution (manufactured by Nippon Chemical Industrial Co., Ltd., Sodium Silicate J3) and 305.0 g of precipitated silica (manufactured by Tosoh Silica Corporation, trade name: Nipsil® ER) as the Si element source, and 10.0 g of chabazite seed crystals (SAR13) were added, and the mixture was thoroughly mixed to obtain a starting material composition (mixture). The composition of the starting material composition was SiO$_2$:0.053Al$_2$O$_3$: 0.125TMAdaOH:0.095Na$_2$O:44.0H$_2$O in terms of molar ratio.

<Synthesis of CHA-Type Aluminosilicate>

This starting material composition (mixture) was added into a 5,000 cc stainless autoclave, which was then hermetically sealed. Then, the starting material composition was heated to 160° C. with stirring at 300 rpm, kept for 96 hours. The product after this hydrothermal treatment was separated by solid-liquid separation. The obtained solid phase was washed with a sufficient amount of water and dried at 105° C. to obtain a product. As a result of conducting powder X-ray diffractometry analysis, the product was confirmed to be a pure CHA-type aluminosilicate, i.e., a single phase of a chabazite-type synthetic zeolite. As a result of conducting fluorescent X-ray analysis, the obtained CHA-type aluminosilicate of Comparative Example 1 had a silica-alumina ratio (SiO$_2$/Al$_2$O$_3$) of 16.3.

<Ion Exchange of CHA-Type Aluminosilicate>

The procedures were performed in the same way as in Example 1 except for using the obtained CHA-type aluminosilicate of Comparative Example 1.

<Supporting of Cu and High Temperature Drying Treatment>

160 g of the obtained NH$_4^+$-type CHA-type aluminosilicate of Comparative Example 1 was impregnated with 84 g of an aqueous solution containing 25% copper nitrate trihydrate, then the mixture was dried at 105° C., and further subjected to a high temperature drying treatment at 200° C. for 16 hours to obtain a Cu supported CHA-type aluminosilicate (Cu supported CHA-type zeolite) of Comparative Example 1. The supported amount of Cu in terms of solid content measured by fluorescent X-ray analysis was 3.9% by mass.

<Production of Honeycomb Laminated Catalyst>

Then, the procedures were performed in the same way as in Example 1 except for using the obtained Cu supported CHA-type aluminosilicate of Comparative Example 1 to produce a honeycomb laminated catalyst of Comparative Example 1.

Comparative Example 2

<Preparation of Mixture>

To 1,125.0 g of a TMAdaOH 25% aqueous solution, 2,990 g of pure water, 630 g of an amorphous synthetic aluminum silicate in a solid powder form (manufactured by Kyowa Chemical Industry Co., Ltd., synthetic aluminum silicate, trade name: KYOWAAD® 700SL, SAR: 9.7) as the Si—Al element source, 340.0 g of precipitated silica (manufactured by Tosho Silica Corp., trade name: Nipsil® ER) as the Si element source, 85.0 g of sodium hydroxide (content: 97% or more), and 30.0 g of chabazite seed crystals (SAR13) were added, and the mixture was thoroughly mixed to obtain a starting material composition (mixture). The composition of the starting material composition was $SiO_2:0.059Al_2O_3:0.109TMAdaOH:0.100Na_2O:18.1H_2O$ in terms of molar ratio.

<Synthesis of CHA-Type Aluminosilicate>

This starting material composition (mixture) was added into a 5,000 cc stainless autoclave, which was then hermetically sealed. Then, the starting material composition was heated to 160° C. with stirring at 300 rpm, kept for 48 hours, and then further kept at 170° C. for 48 hours. The product after this hydrothermal treatment was separated by solid-liquid separation. The obtained solid phase was washed with a sufficient amount of water and dried at 105° C. to obtain the product. As a result of conducting powder X-ray diffractometry, the product was confirmed to be a pure CHA-type aluminosilicate, i.e., a single phase of a chabazite-type synthetic zeolite. As a result of conducting fluorescent X-ray analysis, the obtained CHA-type aluminosilicate of Comparative Example 2 had a silica-alumina ratio ($SiO_2/Al_2O_3$) of 15.4.

<Ion Exchange of CHA-Type Aluminosilicate>

The procedures were performed in the same way as in Example 1 except for using the obtained CHA-type aluminosilicate of Comparative Example 2.

<Supporting of Cu and Calcination Treatment>

220 g of the obtained $NH_4^+$-type CHA-type aluminosilicate of Comparative Example 2 was impregnated with 46 g of an aqueous solution containing 25% copper nitrate trihydrate and 64 g of water, then the mixture was dried at 105° C., and further subjected to a calcination treatment at 500° C. for 4 hours to obtain a Cu supported CHA-type aluminosilicate (Cu supported CHA-type zeolite) of Comparative Example 2.

<Production of Honeycomb Laminated Catalyst>

Then, the procedures were performed in the same way as in Example 1 except for using the obtained Cu supported CHA-type aluminosilicate of Comparative Example 2 to produce a honeycomb laminated catalyst of Comparative Example 2.

Comparative Example 3

<Supporting of Cu>

120 g of the $NH_4^+$ type CHA-type aluminosilicate of Example 2 was impregnated with a mixed solution of 34.6 g of an aqueous solution containing 50% copper nitrate trihydrate and 26 g of water, and the mixture was then dried at 100 to 120° C. The dried product was impregnated with a mixed solution (pH 11.0) of 12.0 g of morpholine and 48 g of water, and the mixture was dried at 100 to 120° C. again to obtain a Cu supported CHA-type aluminosilicate (Cu supported CHA-type zeolite) of Comparative Example 3.

<Production of Honeycomb Laminated Catalyst>

Then, the procedures were performed in the same way as in Example 1 except for using the obtained Cu supported CHA-type aluminosilicate of Comparative Example 3 to produce a honeycomb laminated catalyst of Comparative Example 3.

<Laboratory Measurement of Nitrogen Oxide Reduction Efficiency>

The honeycomb laminated catalyst (laminated catalyst composed of the honeycomb support coated with the Cu supported CHA-type aluminosilicate) was cut into a cylindrical form of 25.4 mmϕ in diameter×50 mm in length to form each measurement sample. These were placed in an electric furnace (trade name OXK-600X, manufactured by KYOEI ELECTRIC KILNS CO., LTD.) connected with a gas humidifier (trade name RMG-1000, manufactured by J-SCIENCE LAB CO., Ltd.), and were held at 650° C. for 100 hours or at 750° C. for 40 hours under air containing 10% water vapor at a flow rate of 70 L/min to perform each hydrothermal endurance treatment. The samples after this hydrothermal endurance treatment were loaded in a catalyst evaluation apparatus (trade name: SIGU-2000, manufactured by HORIBA, Ltd.), and their gas composition was analyzed using an automobile exhaust gas measurement apparatus (trade name: MEXA-6000FT, manufactured by HORIBA, Ltd.) to measure each nitrogen oxide reduction efficiency in the steady stream of model gas. Here, the model gas used contained 210 ppm of NO, 40 ppm of $NO_2$, 250 ppm of $NH_3$, 4% $H_2O$, 10% $O_2$, and a balance of $N_2$, and the measurement was performed in a temperature range of 170° C. to 500° C. at a space velocity of SV=59,000 $h^{-1}$.

The results are shown in Table 1.

TABLE 1

| | SAR | Cu wt % | P wt % | Cu/T | P/T | P/Cu | Crystallite size Å | NOx reduction efficiency (%) 650° C. endurance | | NOx reduction efficiency (%) 750° C. endurance | |
|---|---|---|---|---|---|---|---|---|---|---|---|
| | | | | | | | | 200° C. | 500° C. | 200° C. | 500° C. |
| Comparative Example 1 | 16.3 | 3.9% | — | 0.038 | 0.000 | 0.000 | 516 | 73 | 72 | — | — |
| Comparative Example 2 | 15.4 | 3.1% | — | 0.030 | 0.000 | 0.000 | 325 | 85 | 88 | 74 | 77 |
| Comparative Example 3 | 11.3 | 3.9% | — | 0.038 | 0.000 | 0.000 | 401 | 85 | 88 | 75 | 79 |
| Example 1 | 15.5 | 3.4% | 2.2% | 0.035 | 0.045 | 1.294 | 311 | 91 | 88 | 85 | 83 |
| Example 2 | 11.3 | 3.7% | 2.0% | 0.038 | 0.041 | 1.082 | 401 | 90 | 90 | 80 | 78 |

Example 3

<Preparation of Mixture>

To 1,270.0 g of an aqueous solution containing 20% 1,1,3,5-tetramethylpiperidinium hydroxide (manufactured by Sachem, hereinafter, also referred to as a "TMPOH 20% aqueous solution"), 1.060 g of pure water, 166.0 g of FAU-type zeolite (manufactured by Zeolyst, trade name: CBV-712, SAR 10.9) as the Si—Al element source, and 1,830.0 g of Sodium Silicate J3 (manufactured by Nippon Chemical Industrial Co., Ltd., $SiO_2$ content ratio: 29.0% by mass) as the Si element source were added, and the mixture was thoroughly mixed to obtain a starting material composition (mixture). The composition of the starting material composition was $SiO_2$:0.016$Al_2O_3$:0.152TMPOH: 0.261$Na_2O$:16.7$H_2O$ in terms of molar ratio.

<Synthesis of AEI-Type Aluminosilicate>

This starting material composition (mixture) was added into a 5,000 cc stainless autoclave, which was then hermetically sealed. Then, the starting material composition was heated to 150° C. with stirring at 200 rpm, kept for 96 hours, and then further heated to 160° C. and kept for 24 hours. The product after this hydrothermal treatment was separated by solid-liquid separation. The obtained solid phase was washed with a sufficient amount of water and dried at 105° C. to obtain the product. As a result of conducting powder X-ray diffractometry analysis, the product was confirmed to be a single phase of pure AEI-type aluminosilicate. As a result of conducting fluorescent X-ray analysis, the obtained AEI-type aluminosilicate of Example 3 had a silica-alumina ratio ($SiO_2/Al_2O_3$) of 14.3.

<Calcination and Ion-Exchange of AEI-Type Aluminosilicate>

The obtained AEI-type aluminosilicate of Example 3 was calcined at 594° C., then ion-exchanged two repetitive times using an aqueous ammonium nitrate solution containing ammonium nitrate in the same amount thereas and a 10-fold amount of water, then washed with a sufficient amount of pure water, and dried at 120° C. to obtain a $NH_4^+$-type AEI-type aluminosilicate ($NH_4^+$-type AEI-type zeolite).

<Supporting of Cu, Supporting of P>

149 g of the obtained $NH_4^+$ type AEI-type aluminosilicate was impregnated with a mixture of 39.5 g of an aqueous solution containing 50% copper nitrate trihydrate and 35 g of water, and the mixture was then dried at 100 to 120° C. The dried product was impregnated with a mixture of 6 g of 85% phosphoric acid, 12 g of morpholine and 62 g of water (treatment solution, pH=7.5) under an environment of 25° C., and the mixture was dried at 100 to 120° C. again to obtain a Cu—P co-supported AEI-type aluminosilicate (Cu—P co-supported AEI-type zeolite) of Example 3. The supported amount of Cu in terms of solid content measured by fluorescent X-ray analysis was 3.9% by mass and the supported amount of P was 1.2% by mass.

<Production of Honeycomb Laminated Catalyst>

The obtained Cu—P co-supported AEI-type aluminosilicate of Example 3 was wet-coated with a honeycomb support at a supporting ratio of 180 g per L of the honeycomb support, followed by calcination at 500° C. to obtain a honeycomb laminated catalyst of Example 3 in which a catalyst layer containing the Cu—P co-supported AEI-type aluminosilicate was disposed on the honeycomb support.

Comparative Example 4

The procedures were performed in the same way as in Example 3 except that $NH_4^+$-type AEI-type aluminosilicate obtained in the same manner as Example 3 was used, and the P supporting was not performed by omitting blending of phosphoric acid at the time of Cu supporting, to obtain a Cu supported AEI-type aluminosilicate (Cu supported AEI-type zeolite) of Comparative Example 4. The supported amount of Cu in terms of solid content measured by fluorescent X-ray analysis was 4.0% by mass. Further, the procedures were performed in the same way as in Example 3 except for using the Cu supported AEI-type aluminosilicate of Comparative Example 4 to produce a honeycomb laminated catalyst of Comparative Example 4.

The honeycomb laminated catalysts of Example 3 and Comparative Example 4 were evaluated for their performance in the same way as in Example 1. The results are shown in Table 2.

TABLE 2

|  | SAR | Cu wt % | P wt % | Cu/T | P/T | P/T | Crystallite size Å | NOx reduction efficiency (%) 650° C. endurance 200° C. |
|---|---|---|---|---|---|---|---|---|
| Comparative Example 4 | 14.3 | 3.9% | — | 0.020 | 0.000 | 0.000 | 586 | 90 |
| Example 3 | 14.3 | 4.0% | 1.2% | 0.020 | 0.012 | 0.636 | 570 | 91 |

Example 4

<Preparation of Mixture>

To 2,050.0 g of an aqueous solution containing 40% tetrapropylammonium hydroxide (hereinafter, also referred to as a "TPAOH 40% aqueous solution"), 700 g of pure water, 107 g of aluminum hydroxide in a solid powder form (manufactured by Sigma-Aldrich Co.) as the Al element source, and 650.0 g of amorphous silica (manufactured by Tosoh Silica Corporation, trade name: Nipsil® E200A, $SiO_2$ content ratio: 93.8% by mass) as the Si element source were added, and the mixture was thoroughly mixed, and then kept at 95° C. for 24 hours. To this, 250.0 g of pure water, a solution of hexamethonium chloride dihydrate (manufactured by Tokyo Chemical Industry Co., Ltd.) dissolved in 630.0 g of pure water, and a solution of 60.0 g of potassium hydroxide (manufactured by FUJIFILM Wako Pure Chemical Corporation, content 85% or more) dissolved in 130.0 g of pure water were added, respectively, and the mixture was thoroughly mixed to obtain a starting material composition (mixture). The composition of the starting material composition was $SiO_2$:0.060$Al_2O_3$:0.397TPAOH:0.105hexamethonium:0.046$K_2O$:16.6$H_2O$ in terms of molar ratio.

<Synthesis of ERI-Type Aluminosilicate>

This starting material composition (mixture) was added into a 5,000 cc stainless autoclave, which was then hermetically sealed. Then, the starting material composition was heated to 125° C. with stirring at 70 rpm and kept for 120 hours. The product after this hydrothermal treatment was separated by solid-liquid separation. The obtained solid phase was washed with a sufficient amount of water and dried at 105° C. to obtain the product. As a result of conducting powder X-ray diffractometry analysis, the product was confirmed to be a single phase of a pure ERI-type aluminosilicate. As a result of conducting fluorescent X-ray analysis, the obtained ERI-type aluminosilicate of Example 4 had a silica-alumina ratio ($SiO_2/Al_2O_3$) of 14.3.

<Calcination and Ion-Exchange of ERI-Type Aluminosilicate>

The obtained ERI-type aluminosilicate of Example 4 was calcined at 550° C., then ion-exchanged three repetitive times using an aqueous ammonium nitrate solution containing a 1.5-fold amount of ammonium nitrate and a 10-fold amount of water, then washed with a sufficient amount of pure water, and dried at 120° C. to obtain a $NH_4^+$-type ERI-type aluminosilicate ($NH_4^+$-type ERI-type zeolite).

<Supporting of Cu, Supporting of P>

132 g of the obtained $NH_4^+$ type ERI-type aluminosilicate was impregnated with a mixture of 26.3 g of an aqueous solution containing 50% copper nitrate trihydrate and 40 g of water, and the mixture was then dried at 100 to 120° C. The dried product was impregnated with a mixture of 3.1 g of 85% phosphoric acid, 9.3 g of morpholine and 49.3 g of water (treatment solution, pH=7.6) under an environment of 25° C., and the mixture was dried at 100 to 120° C. again to obtain a Cu—P co-supported ERI-type aluminosilicate (Cu—P co-supported ERI-type zeolite) of Example 4. The supported amount of Cu in terms of solid content measured by fluorescent X-ray analysis was 2.8% by mass and the supported amount of P was 1.3% by mass.

<Production of Honeycomb Laminated Catalyst>

The obtained Cu—P co-supported ERI-type aluminosilicate of Example 4 was wet-coated with a honeycomb support at a supporting ratio of 180 g per L of the honeycomb support, followed by calcination at 500° C. to obtain a honeycomb laminated catalyst of Example 4 in which a catalyst layer containing the Cu—P co-supported ERI-type aluminosilicate was disposed on the honeycomb support.

Comparative Example 5

The procedures were performed in the same way as in Example 4 except that $NH_4^+$-type ERI-type aluminosilicate obtained in Example 4 was used, and the P supporting was not performed by omitting blending of phosphoric acid at the time of Cu supporting, to obtain a Cu supported ERI-type aluminosilicate (Cu supported ERI-type zeolite) of Comparative Example 5. The supported amount of Cu in terms of solid content measured by fluorescent X-ray analysis was 2.9% by mass. Then, the procedures were performed in the same way as in Example 4 except for using the Cu supported ERI-type aluminosilicate of Comparative Example 5 to produce a honeycomb laminated catalyst of Comparative Example 5.

The honeycomb laminated catalysts of Example 4 and Comparative Example 5 were evaluated for their performance in the same way as in Example 1. The results are shown in Table 3.

TABLE 3

| | SAR | Cu wt % | P wt % | Cu/T | P/T | P/T | Crystallite size Å | NOx reduction efficiency (%) 650° C. endurance 200° C. |
|---|---|---|---|---|---|---|---|---|
| Comparative Example 5 | 14.3 | 2.9% | — | 0.014 | 0.000 | 0.000 | 501 | 58 |
| Example 4 | 14.3 | 2.8% | 1.3% | 0.014 | 0.014 | 0.988 | 445 | 64 |

INDUSTRIAL APPLICABILITY

The Cu—P co-supported zeolite of the present invention has excellent thermal endurance and is able to maintain high adsorption performance, catalyst performance or the like even in a high-temperature environment or after exposure to high temperature. Thus, the Cu—P co-supported zeolite of the present invention can be used widely and effectively for purposes such as an adsorbent, a separating agent, an ion exchanger, an adsorbent, a catalyst, and a catalyst support. In particular, the Cu—P co-supported zeolite of the present invention can be especially effectively used as a catalyst for exhaust gas purification which purifies exhaust gas from diesel automobiles, gasoline automobiles, jet engines, boilers, gas turbines, or the like, which is exposed to a severe use environment, or a catalyst support thereof, and a nitrogen oxide catalyst or a catalyst support thereof, etc.

The invention claimed is:

1. A Cu—P co-supported zeolite comprising a small pore size zeolite, and an extra framework copper atom and an extra framework phosphorus atom supported on the small pore size zeolite,
    wherein
    the small pore size zeolite has at least one framework structure of CHA in measurement by powder X-ray diffractomety,
    the Cu—P co-supported zeolite has a silica-alumina ratio ($SiO_2/Al_2O_3$) of from 7 to 20,
    the Cu—P co-supported zeolite has a ratio of the copper atom to a tetrahedral site in the zeolite (Cu/T) of from 0.005 to 0.060,
    the Cu—P co-supported zeolite has a ratio of the phosphorus atom to the T atom (P/T) of from 0.005 to 0.060, and
    the Cu—P co-supported zeolite has a ratio of the phosphorus atom to the copper atom (P/Cu) of from 1.0 to 1.5.

2. The Cu—P co-supported zeolite according to claim 1, wherein the small pore size zeolite has an oxygen 8-membered ring structure.

3. The Cu—P co-supported zeolite according to claim 1, wherein the small pore size zeolite has a crystallite size of from 10 nm to 50 nm in measurement by powder X-ray diffractometry.

4. The Cu—P co-supported zeolite according to claim 1, wherein the small pore size zeolite has a crystallite size of from 15 nm to 100 nm in measurement by powder X-ray diffractometry.

5. The Cu—P co-supported zeolite according to claim 1, wherein the Cu—P co-supported zeolite has an average particle size $D_{50}$ of from 0.01 μm to 20 μm.

6. A selective catalytic reduction catalyst comprising the Cu—P co-supported zeolite according to claim 1.

7. A selective catalytic reduction catalyst formed article obtained by forming a composition comprising the Cu—P co-supported zeolite according to claim 1 into a predetermined shape.

8. A catalyst, comprising a substrate and a catalyst layer provided on at least one side of the substrate, wherein the catalyst layer comprises the Cu—P co-supported zeolite according to claim 1.

\* \* \* \* \*